(12) United States Patent
Kim et al.

(10) Patent No.: US 11,267,942 B2
(45) Date of Patent: Mar. 8, 2022

(54) POLYAMIDE-IMIDE FILM

(71) Applicant: SKC CO., LTD., Gyeonggi-do (KR)

(72) Inventors: Sunhwan Kim, Incheon (KR); Dae Seong Oh, Seoul (KR); Jin Woo Lee, Gyeonggi-do (KR); Dawoo Jeong, Gyeonggi-do (KR); Dong Jin Lim, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 258 days.

(21) Appl. No.: 16/477,730

(22) PCT Filed: Feb. 2, 2018

(86) PCT No.: PCT/KR2018/001467
§ 371 (c)(1),
(2) Date: Jul. 12, 2019

(87) PCT Pub. No.: WO2018/147602
PCT Pub. Date: Aug. 16, 2018

(65) Prior Publication Data
US 2019/0359772 A1  Nov. 28, 2019

(30) Foreign Application Priority Data

Feb. 8, 2017 (KR) .................. 10-2017-0017550
Apr. 4, 2017 (KR) .................. 10-2017-0043474

(51) Int. Cl.
| | | |
|---|---|---|
| C08G 73/14 | (2006.01) | |
| C08J 5/18 | (2006.01) | |
| B29C 39/24 | (2006.01) | |
| B29C 39/38 | (2006.01) | |
| B29C 39/42 | (2006.01) | |
| B29C 39/44 | (2006.01) | |
| C08G 73/10 | (2006.01) | |
| C08L 79/08 | (2006.01) | |
| B29C 41/00 | (2006.01) | |
| B29K 77/00 | (2006.01) | |
| B29K 105/00 | (2006.01) | |

(52) U.S. Cl.
CPC .............. *C08J 5/18* (2013.01); *B29C 39/24* (2013.01); *B29C 39/38* (2013.01); *B29C 39/42* (2013.01); *B29C 39/44* (2013.01); *C08G 73/1039* (2013.01); *C08G 73/14* (2013.01); *C08L 79/08* (2013.01); *B29C 41/003* (2013.01); *B29K 2077/00* (2013.01); *B29K 2105/0094* (2013.01); *C08J 2379/08* (2013.01); *C08L 2201/10* (2013.01); *C08L 2203/16* (2013.01)

(58) Field of Classification Search
CPC ...... C08G 73/14; C08J 2379/08; C08L 79/08; C09D 179/08
See application file for complete search history.

(56) References Cited

U.S. PATENT DOCUMENTS

| | | |
|---|---|---|
| 9,018,343 B2 | 4/2015 | Park et al. |
| 2015/0299392 A1* | 10/2015 | Park ..................... C08G 73/14 528/289 |

FOREIGN PATENT DOCUMENTS

| | | |
|---|---|---|
| JP | 2014-528490 A | 10/2014 |
| JP | 2015-521686 A | 7/2015 |
| JP | 2016-125063 | 7/2016 |
| KR | 10-1529496 | 6/2015 |
| KR | 10-2016-0081829 | 7/2016 |
| KR | 10-2016-0094086 | 8/2016 |
| KR | 10-2016-0095910 | 8/2016 |

OTHER PUBLICATIONS

Office Action issued by the Japanese Patent Office dated May 11, 2021.

* cited by examiner

*Primary Examiner* — Gregory Listvoyb
(74) *Attorney, Agent, or Firm* — IP & T Group LLP

(57) ABSTRACT

One embodiment may provide a polyamide-imide film which is colorless and transparent while having an adequate level of solubility and excellent mechanical properties, the polyamide-imide film comprising a polyamide-imide polymer formed by polymerizing an aromatic diamine compound, an aromatic dianhydride compound and a dicarbonyl compound, wherein, for a square cross-section of 1 cm×1 cm and a thickness of 30 um to 100 mm, the polyamide-imide film has a dissolution time of 5-60 minutes in 10 ml of dimethylacetamide (DMAc), and for a thickness of 50 mm, the polyamide-imide film has a yellowness of at most 5, a haze of at most 2%, a permeability of at least 85% and a modulus of at least 5.0 GPa.

9 Claims, No Drawings

POLYAMIDE-IMIDE FILM

This application is a national stage application of PCT/KR2018/001467 filed on Feb. 2, 2018, which claims priority of Korean patent application number 10-2017-0017550 filed on Feb. 8, 2017 and Korean patent application number 10-2017-0043474 filed on Apr. 4, 2017. The disclosure of each of the foregoing applications is incorporated herein by reference in its entirety.

TECHNICAL FIELD

Embodiments relate to a polyamide-imide film having an appropriate solubility and excellent mechanical properties.

BACKGROUND ART

Since polyamide-imide (PAI) is excellent in resistance to friction, heat, and chemicals, it is employed in such applications as primary electrical insulation, coatings, adhesives, resins for extrusion, heat-resistant paintings, heat-resistant boards, heat-resistant adhesives, heat-resistant fibers, and heat-resistant films.

Polyamide-imide is used in various fields. For example, polyamide-imide is made in the form of a powder and used as a coating for a metal or a magnetic wire. It is mixed with other additives depending on the applications thereof. In addition, polyamide-imide is used together with a fluoropolymer as a painter for decoration and corrosion prevention. It also plays a role of bonding a fluoropolymer to a metal substrate. Further, polyamide-imide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide-imide has been developed in the form of a film, which is less expensive and has excellent optical, mechanical, and thermal characteristics.

DISCLOSURE OF INVENTION

Technical Problem

Embodiments aim to provide a polyamide-imide film having an appropriate solubility and excellent mechanical properties.

Solution to Problem

According to an embodiment, there is provided a polyamide-imide film, which comprises a polyamide-imide polymer formed by polymerizing an aromatic diamine compound, an aromatic dianhydride compound, and a dicarbonyl compound, wherein the time for which the polyamide-imide film in a square of 1 cm×1 cm and in a thickness of 30 μm to 100 μm is dissolved in 10 ml of dimethylacetamide (DMAc) is 5 to 60 minutes, and the polyamide-imide film has a yellow index of 5 or less, a haze of 2% or less, a transmittance of 85% or more, and a modulus of 5.0 GPa or more, based on a thickness of 50 μm.

According to another embodiment, there is provided a polyamide-imide film, which comprises a polyamide-imide polymer formed by polymerizing an aromatic diamine compound, an aromatic dianhydride compound, and a dicarbonyl compound, and which has a yellow index of 5 or less, a haze of 2% or less, a transmittance of 85% or more, and a modulus of 5.0 GPa or more, based on a thickness of 50 μm, wherein the amount of increase in haze of the polyamide-imide film measured according to the following surface solubility measurement method is 20% to 50%:

<Surface Solubility Measurement Method>

The surface of the polyamide-imide film placed on a flat surface is rubbed back and forth 10 times with a cotton swab soaked in DMAc at a force of 0.1 N and at a speed of 5 cm/sec, and the amount of increase in haze is then measured.

Advantageous Effects of Invention

The polyamide-imide film according to the embodiment is colorless and transparent and has an appropriate solubility and excellent mechanical properties.

BEST MODE FOR CARRYING OUT THE INVENTION

Hereinafter, the present invention will be described in detail with reference to the examples. The examples may be modified into various forms as long as the gist of the invention is not altered.

In this specification, when a part is referred to as "comprising" an element, it is to be understood that the part may comprise other elements as well, unless otherwise indicated.

Further, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

Embodiments provide a polyamide-imide film having an appropriate solubility and excellent mechanical properties.

The polyamide-imide film according to the embodiments comprises a polyamide-imide polymer formed by polymerizing an aromatic diamine compound, an aromatic dianhydride compound, and a dicarbonyl compound.

The polyamide-imide polymer comprises an imide repeat unit derived from the polymerization of the aromatic diamine compound and the aromatic dianhydride compound and amide repeat units derived from the polymerization of the aromatic diamine compound and the dicarbonyl compound.

The aromatic diamine compound is a compound that forms an imide bond with the aromatic dianhydride compound and forms amide bonds with the dicarbonyl compound, to thereby form a copolymer.

In an embodiment, one kind of aromatic diamine may be used as the aromatic diamine compound. If a single kind of aromatic diamine compound is used, the chemical structure of the polyamide-imide polymer can be easily designed, and the process efficiency can be enhanced.

For example, the aromatic diamine compound may comprise 2,2'-bis(trifluoromethyl)-4,4'-diaminobiphenyl (TFDB) represented by the following Formula 1, but it is not limited thereto.

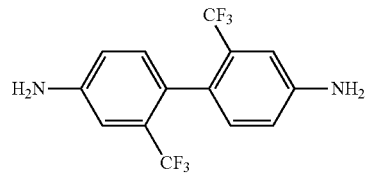

[Formula 1]

The aromatic dianhydride compound is a compound that can contribute to improvements in the optical properties such as transmittance of the polyamide-imide film, since it has a low birefringence value.

In an embodiment, one kind of aromatic dianhydride may be used as the aromatic diamine compound. If a single kind of aromatic diamine compound is used, the chemical structure of the polyamide-imide polymer can be easily designed, and the process efficiency can be enhanced.

For example, the aromatic dianhydride compound may comprise 2,2'-bis-(3,4-dicarboxyphenyl) hexafluoropropane dianhydride (6-FDA) represented by the following Formula 2, but it is not limited thereto.

[Formula 2]

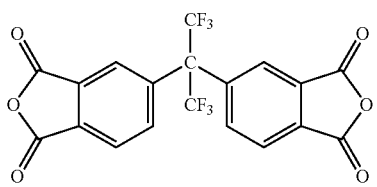

The aromatic diamine compound and the dianhydride compound may be polymerized to form a polyamic acid.

Subsequently, the polyamic acid may be converted to a polyimide through a dehydration reaction, and the polyimide comprises an imide repeat unit.

For example, the polyimide may comprise a compound represented by the following Formula 3, but it is not limited thereto.

[Formula 3]

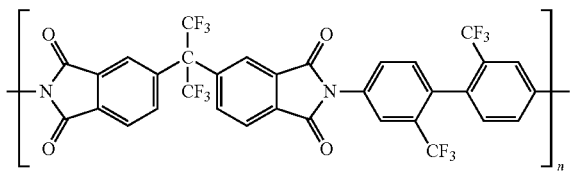

In the above Formula 3, n is an integer of 1 to 400.

The dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of the polyamide-imide film thus produced.

In an embodiment, two kinds of aromatic dicarbonyl compound may be used as the dicarbonyl compound. If two kinds of aromatic diamine compound are used, the chemical structure of the polyamide-imide polymer can be designed to materialize the desired properties, and the process efficiency can be enhanced.

The dicarbonyl compound may comprise terephthaloyl chloride (TPC), 1,1'-biphenyl-4,4'-dicarbonyl dichloride (BPDC), or a combination thereof. But it is not limited thereto.

For example, the first dicarbonyl compound may comprise 1,1'-biphenyl-4,4'-dicarbonyl dichloride (BPDC) represented by the following Formula 4, but it is not limited thereto.

[Formula 4]

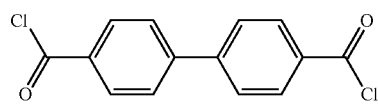

Further, the second dicarbonyl compound may comprise terephthaloyl chloride (TPC) represented by the following Formula 5, but it is not limited thereto.

[Formula 5]

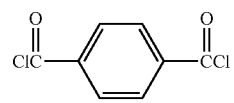

If 1,1'-biphenyl-4,4'-dicarbonyl dichloride (BPDC) is used as the first dicarbonyl compound and terephthaloyl chloride (TPC) is used as the second dicarbonyl compound in a proper combination, the polyamide-imide film thus produced may have high oxidation resistance.

In addition, the aromatic diamine compound and the dicarbonyl compound may be polymerized to form amide repeat units represented by the following Formulae 6 and 7.

[Formula 6]

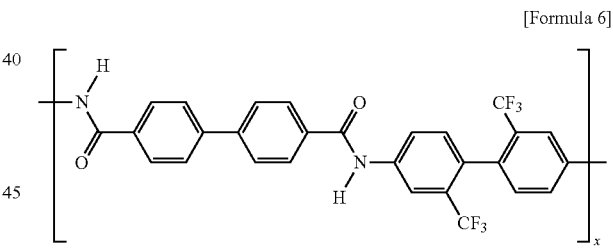

[Formula 7]

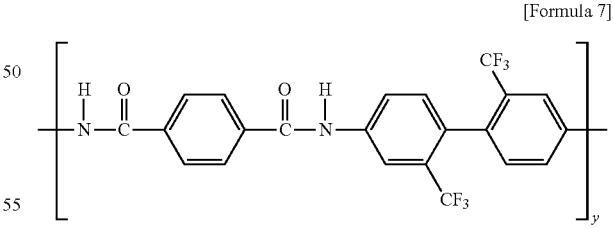

In the above Formula 6, x is an integer of 1 to 400.
In the above Formula 7, y is an integer of 1 to 400.

The aromatic diamine compound may comprise 2,2'-bis(trifluoromethyl)-4,4'-diaminobiphenyl (TFDB), the aromatic dianhydride compound may comprise 2,2'-bis(3,4-dicarboxyphenyl) hexafluoropropane dianhydride (6-FDA), and the dicarbonyl compound may comprise terephthaloyl chloride (TPC), 1,1'-biphenyl-4,4'-dicarbonyl dichloride (BPDC), or a combination thereof, but they are not limited thereto.

An embodiment is characterized in that it is capable of providing a polyamide-imide film whose optical characteristics, mechanical properties, and flexibility are improved in a well-balanced manner without a complicated process by properly controlling the content of the imide repeat unit and those of the amide repeat units. Further, it is possible to provide a polyamide-imide film whose optical characteristics, mechanical properties, and flexibility are improved in a well-balanced manner without such steps as precipitation, filtration, drying, and redissolution as adopted in the prior art.

The content of the imide repeat unit and those of the amide repeat units may be controlled by the amounts of the aromatic dianhydride compound and the dicarbonyl compound to be fed.

In the polyamide-imide polymer contained in the polyamide-imide film, the molar ratio of the imide repeat unit to the amide repeat units may be 40:60 to 20:80, for example 50:50 to 20:80, but it is not limited thereto.

If the molar ratio of the imide repeat unit to the amide repeat units is within the above range, the polyamide-imide film is excellent in such optical properties as transmittance and haze as well as excellent mechanical properties.

The polyamide-imide film has an appropriate solubility in a solvent. For example, the time for which the polyamide-imide film according to the embodiment in a square of 1 cm×1 cm and in a thickness of 30 μm to 100 μm is dissolved in 10 ml of dimethylacetamide (DMAc) is 5 to 60 minutes. Specifically, the dissolution time may be about 10 minutes to about 50 minutes. More specifically, the dissolution time may be about 20 minutes to about 40 minutes.

If the solubility of the polyamide-imide film satisfies the above condition, it can be indirectly confirmed that the polyamide-imide polymer in the film is oriented and packed at a proper molecular distance, and the polyamide-imide film that satisfies the above solubility condition can secure the desired mechanical properties and optical properties at the same time.

In addition, the amount of increase in haze of the polyamide-imide film measured according to the following surface solubility measurement method may be 20% to 50%. Specifically, the amount of increase in haze may be 25% to 40%, but it is not limited thereto.

<Surface Solubility Measurement Method>

The surface of the polyamide-imide film placed on a flat surface is rubbed back and forth 10 times with a cotton swab soaked in DMAc at a force of 0.1 N and at a speed of 5 cm/sec, and the amount of increase in haze is then measured.

If the amount of increase in haze according to the above surface solubility measurement method satisfies the above condition, it can be indirectly confirmed that the polyamide-imide polymer in the film is oriented and packed at a proper molecular distance on the surface region of the film. The polyamide-imide film may be applied as a cover window for a flexible display. Here, the cover window is a component disposed on the outermost side of the display, and its surface characteristics are important physical properties that determine the function of the entire display. That is, the polyamide-imide film that satisfies the above condition for the amount of increase in haze according to the surface solubility measurement method can secure the desired mechanical properties and optical properties at the same time. Thus, when it is applied to a cover window of a flexible display, it can materialize an excellent function.

As the polyamide-imide film has appropriate crystallinity, it can have excellent mechanical properties. For example, if the strength is measured when the polyamide-imide film is perforated while it is compressed using a 2.5 mm spherical tip in a UTM compression mode, the perforation strength may be about 20 kgf or more based on a thickness of 30 to 50 μm. Specifically, the perforation strength may be about 25 kgf or more under these conditions. More specifically, the perforation strength may be about 30 kgf to 100 kgf under these conditions.

In addition, the diameter of the perforation including a crack or the like may be about 55 mm or less. Specifically, the diameter of the perforation may be about 50 mm or less. More specifically, the diameter of the perforation may be about 40 mm or less. Even more specifically, the diameter of the perforation may be about 30 mm or less. But it is not limited thereto.

Further, the polyamide-imide film may contain inorganic particles such as silica particles or the like. The diameter of the silica particles may be about 10 nm to 200 nm. In the polyamide-imide film according to the embodiment, the number of silica particles on the surface visible on an atomic force microscope (AFM) image may be about 5 to about 30 based on a size of 10 μm×10 μm. Accordingly, the polyamide-imide film according to the embodiment can have improved windability and low haze.

The polyamide-imide film may have an orientation angle of about ±30° to about ±50° based on the machine direction (or MD).

If the polyamide-imide film according to the embodiment has an orientation angle in the above range, it may have improved optical and mechanical characteristics. The orientation angle of the polyamide-imide film refers to the angle at which the polyamide-imide resin inside the film is oriented based on the direction (i.e., MD) in which the polyamide-imide film is cast.

The polyamide-imide film may have a yellow index (YI) of 5 or less based on a thickness of 20 μm to 70 μm, specifically based on a thickness of 50 μm. Specifically, the yellow index may be 4 or less, but it is not limited thereto. More specifically, the yellow index may be 3 or less, but it is not limited thereto.

The polyamide-imide film may have a haze of 2% or less based on a thickness of 20 μm to 70 μm, specifically based on a thickness of 50 μm. Specifically, the haze may be 1% or less, but it is not limited thereto. More specifically, the haze may be 0.6% or less, but it is not limited thereto.

The polyamide-imide film has a transmittance measured at 550 nm of 85% or more based on a thickness of 20 μm to 70 μm, specifically based on a thickness of 50 μm. Specifically, the transmittance measured at 550 nm may be 88% or more based on a thickness of 25 μm to 60 μm, specifically based on a thickness of 50 μm. More specifically, the transmittance may be 89% or more.

The polyamide-imide film has a modulus of 5.0 GPa or more. Specifically, the modulus of the polyamide-imide film according to the embodiment may be 5.2 GPa or more. In addition, the modulus may be 5.5 GPa or more. The maximum value of the modulus of the polyamide-imide film according to the embodiment may be 10 GPa, but it is not limited thereto.

The polyamide-imide film may have a surface hardness of about HB or higher based on a thickness of 20 μm to 70 μm, more specifically based on a thickness of 25 μm to 60 μm, even more specifically based on a thickness of 50 μm. More specifically, the surface hardness of the polyamide-imide film according to the embodiment may be about H or higher based on the thickness as described above.

The various characteristics of the polyamide-imide film described above may be combined.

For example, the polyamide-imide film comprises a polyamide-imide polymer formed by polymerizing an aromatic diamine compound, an aromatic dianhydride compound, and a dicarbonyl compound, wherein the time for which the polyamide-imide film in a square of 1 cm×1 cm and in a thickness of 30 µm to 100 µm is dissolved in 10 ml of dimethylacetamide (DMAc) may be 5 to 60 minutes, and the polyamide-imide film may have a yellow index of 5 or less, a haze of 2% or less, a transmittance of 85% or more, and a modulus of 5.0 GPa or more, based on a thickness of 50 µm.

As another example, the polyamide-imide film comprises a polyamide-imide polymer formed by polymerizing an aromatic diamine compound, an aromatic dianhydride compound, and a dicarbonyl compound, and may have a yellow index of 5 or less, a haze of 2% or less, a transmittance of 85% or more, and a modulus of 5.0 GPa or more, based on a thickness of 50 µm, wherein the amount of increase in haze of the polyamide-imide film measured according to the following surface solubility measurement method may be 20% to 50%:

<Surface Solubility Measurement Method>

The surface of the polyamide-imide film placed on a flat surface is rubbed back and forth 10 times with a cotton swab soaked in DMAc at a force of 0.1 N and at a speed of 5 cm/sec, and the amount of increase in haze is then measured.

The process for producing the polyamide-imide film according to the embodiment comprises polymerizing an aromatic diamine compound, an aromatic dianhydride compound, and a dicarbonyl compound to prepare a polyamide-imide polymer solution having a viscosity of 100,000 to 500,000 cps, specifically 150,000 to 350,000 cps; and extruding and casting the polymer solution and then drying and thermally treating the cast polymer solution.

The process for producing a polyamide-imide film according to an embodiment comprises polymerizing an aromatic diamine compound, an aromatic dianhydride compound, a first dicarbonyl compound, and a second dicarbonyl compound in an organic solvent to obtain a first polymer solution; further adding the second dicarbonyl compound to the first polymer solution to obtain a second polymer solution having a viscosity of 100,000 to 500,000 cps; and extruding and casting the second polymer solution and then drying and thermally treating the cast second polymer solution.

The organic solvent employed in the polymerization reaction may be at least one selected from the group consisting of dimethylformamide (DMF), dimethylacetamide (DMAc), N-methyl-2-pyrrolidone (NMP), m-cresol, tetrahydrofuran (THF), and chloroform, but it is not limited thereto.

The step of obtaining the first polymer solution may comprise simultaneously or sequentially polymerizing the aromatic diamine compound, the aromatic dianhydride compound, the first dicarbonyl compound, and the second dicarbonyl compound. Specifically, the step of obtaining the first polymer solution may comprise simultaneously polymerizing the aromatic diamine compound, the aromatic dianhydride compound, the first dicarbonyl compound, and the second dicarbonyl compound.

In addition, the step of obtaining the first polymer solution may comprise polymerizing the aromatic diamine compound and the aromatic dianhydride compound to obtain a polyamic acid solution; and adding the first dicarbonyl compound and the second dicarbonyl compound to the polyamic acid solution to polymerize them. The polyamic acid solution is a solution comprising a polyamic acid. In a different way, the step of obtaining the first polymer solution may comprise polymerizing the aromatic diamine compound, the first dicarbonyl compound, and the second dicarbonyl compound to obtain an amide polymer solution; and adding the aromatic dianhydride compound to the amide polymer solution to polymerize them. The amide polymer solution is a solution comprising a polymer having amide repeat units.

The copolymer comprised in the first polymer solution comprises an imide repeat unit derived from the polymerization of the aromatic diamine compound and the aromatic dianhydride compound and amide repeat units derived from the polymerization of the aromatic diamine compound and the dicarbonyl compound.

A catalyst may be further added in the step of obtaining the first polymer solution, in the step of obtaining the second polymer, or after the step of obtaining the second polymer.

Examples of the catalyst include, but are not limited to, beta picoline, acetic anhydride, and the like.

The further addition of the catalyst may expedite the reaction rate and produce the effect of improving the bonding force between the repeat unit structures or that within the repeat unit structure.

In addition, the viscosity of the polymer solution may be appropriately adjusted in the steps of adding the catalyst, drying and redissolving the polymer solution, or the step of adding the solvent for the extrusion step.

The aromatic diamine compound, the aromatic dianhydride compound, the first dicarbonyl compound, and the second dicarbonyl compound may be polymerized to obtain a polyamide-imide polymer.

The polyamide-imide polymer should have an appropriate solubility in the above-mentioned organic solvents. For example, the time for which the polyamide-imide film finally prepared from the polyamide-imide polymer in a square of 1 cm×1 cm and in a thickness of 30 µm to 100 µm is dissolved in 10 ml of dimethylacetamide (DMAc) may be 5 to 60 minutes.

In another embodiment, the step of obtaining the first polymer solution may comprise adding the aromatic dianhydride compound, the first dicarbonyl compound, and the second dicarbonyl compound to an excessive amount of the aromatic diamine compound.

Specifically, the aromatic dianhydride compound may be employed in an amount of 20% by mole to 50% by mole based on the total moles of the aromatic dianhydride compound, the first dicarbonyl compound, and the second dicarbonyl compound, but it is not limited thereto.

If the content of the aromatic dianhydride compound is within the above range, the polyamide-imide film has excellent mechanical properties in terms of surface hardness, tensile strength, and the like.

In addition, the first dicarbonyl compound and the second dicarbonyl compound may be employed in an amount of 50% by mole to 80% by mole based on the total moles of the aromatic dianhydride compound, the first dicarbonyl compound, and the second dicarbonyl compound, but it is not limited thereto.

If the content of the dicarbonyl compounds is within the above range, the polyamide-imide film has excellent optical properties in terms of transmittance, haze, and the like.

In the step of obtaining the first polymer solution in another embodiment, the first dicarbonyl compound may be employed in an amount of 50% by mole to 70% by mole based on the total moles of the first dicarbonyl compound and the second dicarbonyl compound, but it is not limited thereto.

The first dicarbonyl compound may comprise 1,1'-biphenyl-4,4'-dicarbonyl dichloride (BPDC), and the second dicarbonyl compound may comprise terephthaloyl chloride (TPC).

If the content of the first dicarbonyl compound is less than 50% by mole, the tensile strength (or modulus) of the polyamide-imide film may be deteriorated. If the content of the first dicarbonyl compound exceeds 70% by mole, such optical properties as haze and the like may be deteriorated.

Preferably, in the step of obtaining the first polymer solution, (I) an excessive amount of the aromatic diamine compound at least in the same molar amount as that of the other reactants, (II) 20% by mole to 50% by mole of the aromatic dianhydride compound based on the total moles of the aromatic dianhydride compound, the first dicarbonyl compound, and the second dicarbonyl compound, and (III) 50% by mole to 80% of the first dicarbonyl compound and the second dicarbonyl compound based on the total moles of the aromatic dianhydride compound, the first dicarbonyl compound, and the second dicarbonyl compound may be employed.

Specifically, 50% by mole to 70% of the first dicarbonyl compound (e.g., 1,1'-biphenyl-4,4'-dicarbonyl dichloride, BPDC) and 30% by mole to 50% of the second dicarbonyl compound (e.g., terephthaloyl chloride, TPC) based on the total moles of the first dicarbonyl compound and the second dicarbonyl compound may be employed.

It is possible to provide a polyamide-imide film whose optical characteristics, mechanical properties, and flexibility are improved in a well-balanced manner without such steps as precipitation, filtration, drying, and redissolution as adopted in the prior art by properly controlling the content of the imide repeat unit and those of the amide repeat units.

After the step of obtaining the first polymer solution, the second polymer solution having a viscosity of 100,000 to 500,000 cps may be obtained by further adding the second dicarbonyl compound to the first polymer solution.

The weight ratio of the second dicarbonyl compound added in the step of obtaining the first polymer solution to the second dicarbonyl compound added in the step of obtaining the second polymer solution may be 90:10 to 99:1, but it is not limited thereto.

In addition, the second dicarbonyl compound added in the step of obtaining the second polymer solution may be in the form of a solution in which the second dicarbonyl compound is dissolved in an organic solvent at a concentration of 5 to 20% by weight, but it is not limited thereto.

This is advantageous in that the desired viscosity can be accurately achieved.

The viscosity of the second polymer solution may be 100,000 to 500,000 cps, or 150,000 to 350,000 cps, but it is not limited thereto.

If the viscosity of the second polymer solution is within the above range, a polyamide-imide film can be effectively produced in the extrusion and casting steps. In addition, the polyamide-imide film thus produced may have mechanical properties in terms of an improved modulus and the like.

In an embodiment, the content of solids contained in the second polymer solution may be 10% by weight to 20% by weight. Specifically, the content of solids contained in the second polymer solution may be 12% by weight to 18% by weight, but it is not limited thereto.

If the content of solids contained in the second polymer solution is within the above range, a polyamide-imide film can be effectively produced in the extrusion and casting steps. In addition, the polyamide-imide film thus produced may have mechanical properties in terms of an improved modulus and the like and optical properties in terms of a low yellow index and the like.

The aromatic diamine compound, the aromatic dianhydride compound, the first dicarbonyl compound, and the second dicarbonyl compound may be polymerized to obtain a polyamide-imide polymer.

The polyamide-imide polymer should have an appropriate solubility in the above-mentioned organic solvents. For example, the polymer may have such a solubility level that when 0.1 g of a polyamide-imide film finally prepared from the polyamide-imide polymer according to the embodiment is immersed in 10 mL of DMAc, it is observed with the naked eyes that the film is completely dissolved within one hour. As another example, the time for which the polyamide-imide film finally prepared from the polyamide-imide polymer in a square of 1 cm×1 cm and in a thickness of 30 μm to 100 μm is dissolved in 10 ml of dimethylacetamide (DMAc) may be 5 to 60 minutes After the second polymer solution is obtained, the pH of the second polymer solution may be adjusted by adding a neutralizing agent.

Examples of the neutralizing agent include, but are not limited to, amine-based neutralizing agents such as alkoxyamine, alkylamine, alkanolamine, and the like.

The neutralizing agent may be employed in an amount of about 0.1% by mole to about 10% by mole based on the total number of moles of monomers in the polyamide-imide polymer solution.

The pH of the second polymer solution adjusted by the neutralizing agent may be about 4 to about 7. Specifically, the adjusted pH of the second polymer solution may be about 4.5 to about 7.

If the pH of the second polymer solution is within the above-described range, it is possible to prevent damage to the equipment in the subsequent extrusion and casting steps. Further, the polyamide-imide film thus produced may have an effect in that its optical properties are improved by, for example, lowering the yellow index or preventing increases in the yellow index and that its mechanical properties are improved in terms of modulus and the like.

After the step of obtaining the second polymer solution, the polymer solution is extruded and cast, followed by drying and thermally treating the cast polymer solution to produce a polyamide-imide film.

In the above extrusion and casting steps, the above-mentioned organic solvent may be used.

The second polymer solution is extruded and cast onto a casting body such as a casting roll, a casting belt, and the like. In such event, the polymer solution is cast at a rate of about 5 m/min to about 15 m/min and in a thickness of 400 to 500 μm onto the casting body. If the extrusion and casting rates are within the above ranges, the polyamide-imide film thus produced by the production process according to the embodiment can have improved optical characteristics and mechanical characteristics.

That is, if the second polymer solution has a viscosity in the above-mentioned range, the extrusion and casting at the extrusion rate as described above may be advantageous to have improved optical characteristics and mechanical characteristics.

After the polymer solution is cast onto a casting body, the solvent contained in the polymer solution is removed by a drying step to thereby form a gel sheet on the casting body.

The drying step may be carried out at a temperature of from about 60° C. to about 150° C. for a period of time ranging from about 5 minutes to about 60 minutes.

Thereafter, the gel sheet is thermally treated in an atmospheric environment to thereby produce the polyamide-imide film according to the embodiment.

The thermal treatment may be carried out in a temperature range of 60 to 470° C. for 5 to 20 minutes. In more detail, the thermal treatment may be carried out for 5 to 15 minutes in an inline thermal treatment apparatus having in an inlet temperature of about 80° C. to about 300° C. and a temperature elevation rate of 1° C./min to 25° C./min.

Since the polyamide-imide polymer has high oxidation resistance, it is hardly affected by oxygen contained in the atmosphere during the thermal treatment step. Thus, the polyamide-imide film according to the embodiment may have improved optical characteristics.

In addition, nitrogen gas purging is carried out when a polyimide film is formed in the conventional process in order to prevent yellowing of the film and to secure transparency of the film. According to the embodiment, however, a polyamide-imide film having excellent optical characteristics can be produced without such nitrogen gas purging.

MODE FOR THE INVENTION

Example

Hereinafter, the present invention will be described in detail by referring to Examples. But the following Examples are intended to further illustrate the present invention, and the scope of the present invention is not limited thereto.

Example 1

A 1 L glass reactor equipped with a temperature-controllable double jacket was charged with 710.8 g of dimethyl acetamide (DMAc) as an organic solvent at 20° C. under a nitrogen atmosphere. Then, 64 g (0.2 mole) of 2,2'-bis (trifluoromethyl)-4,4'-diaminobiphenyl (TFDB) as an aromatic diamine was slowly added thereto for dissolution thereof.

Subsequently, while 26.6 g (0.06 mole) of 2,2'-bis(3,4-dicarboxyphenyl) hexafluoropropane dianhydride (6-FDA) as an aromatic dianhydride was slowly added thereto, the mixture was stirred for 1 hour.

Then, 23.4 g (0.084 mole) of 1,1'-biphenyl-4,4'-dicarbonyldichloride (BPDC) as a first dicarbonyl compound was added, followed by stirring for 1 hour. And 9.74 g (0.048 mole) of terephthaloyl chloride (TPC) as a second dicarbonyl compound was added, followed by stirring for 1 hour, thereby preparing a first polymer solution.

The viscosity of the first polymer solution thus prepared was measured. If the measured viscosity did not reach the target viscosity, a TPC solution in a DMAc organic solvent at a concentration of 10% by weight was prepared, and 1 mL of the TPC solution was added to the first polymer solution, followed by stirring for 30 minutes. This procedure was repeated until the viscosity became 140,000 cps, thereby preparing a second polymer solution.

The second polymer solution was coated onto a glass plate without such separate steps of precipitation, drying, and redissolution, which was then dried with hot air at 80° C. for 30 minutes. The dried polyamide-imide polymer was peeled off from the glass plate, fixed to a pin frame, and thermally treated in a temperature range of 80° C. to 300° C. at a temperature elevation rate of 2° C./min to obtain a polyamide-imide film having a thickness of 50 μm.

According to Example 1, the yield reached about 100% immediately before the film formation step (i.e., immediately before coating). Here, the "yield" refers to the ratio of the number of moles of the materials remaining in the solution for coating to the number of moles of the charged materials.

According to the conventional production process, the yield immediately before the film formation step is about 60%, which attributes to the loss of the materials that inevitably takes place at the steps of polyimidization, precipitation, filtration, and drying.

Examples 2 to 4 and Comparative Examples 1 and 2

Each polyamide-imide film was produced in the same manner as described above, except that the viscosity of the second polymer solution was as shown in Table 1 below.

Evaluation Example

The films according to Examples 1 to 4 and Comparative Examples 1 and 2 were measured and evaluated for the following properties. The results are shown in Tables 1 and 2 below.

Evaluation Example 1: Measurement of Film Thickness

The thickness at 5 points was measured in the width direction with a Digital Micrometer 547-401 manufactured by Mitsutoyo Corporation, Japan, and an average value thereof was taken.

Evaluation Example 2: Measurement of Transmittance (TT) and Haze (HZ)

The transmittance at 550 nm and the haze were measured using a haze meter NDH-5000W manufactured by Nippon Denshoku Kogyo.

Evaluation Example 3: Measurement of Yellow Index (YI)

The yellow Index (YI) was measured with a spectrophotometer (UltraScan PRO, Hunter Associates Laboratory) using a CIE colorimetric system.

Evaluation Example 4: Measurement of Tensile Strength (or Modulus)

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The slope of the load with respect to the initial strain in the stress-strain curve was taken as a modulus (GPa).

Evaluation Example 5: Appearance

The sample was observed at a 45° oblique angle under a 3-wavelength fluorescent lamp. It was evaluated as "gelation" when a nucleated or non-nucleated circular foreign object was found in the sample. It was evaluated as "○" when such foreign object was not present.

Evaluation Example 6: Solubility

The polyamide-imide film was cut into a square of 1 cm×1 cm and immersed in about 10 ml of DMAc. The time until it was completely dissolved was measured. Whether the sample was completely dissolved was determined with the naked eyes and with a glass rod on the basis of whether any solid component remained.

Evaluation Example 7: Surface Solubility

The polyamide-imide film was placed on a flat surface. A cotton swab was sufficiently soaked in DMAc for 1 minute. Then, the surface of the polyamide-imide film was rubbed back and forth 10 times with the cotton swab at a force of 0.1 N and at a speed of 5 cm/sec. The amount of increase in haze of the polyamide-imide film was then measured.

TABLE 1

|  | Viscosity of the second polymer solution (cps) | Concentration of the polymer (% by weight) | Thickness (μm) | TT (%) | YI | Modulus (GPa) | Appearance |
|---|---|---|---|---|---|---|---|
| Ex. 1 | 140,000 | 12.3 | 50 | 89.8 | 2.56 | 5.33 | ○ |
| Ex. 2 | 180,000 | 12.2 | 50 | 90.2 | 2.22 | 5.23 | ○ |
| Ex. 3 | 210,000 | 11.1 | 50 | 89.4 | 2.17 | 5.41 | ○ |
| Ex. 4 | 350,000 | 11.9 | 50 | 89.8 | 2.39 | 5.40 | ○ |
| C. Ex. 1 | 50,000 | 11.1 | 50 | 89.5 | 2.31 | 4.65 | ○ |
| C. Ex. 2 | 700,000 | 12.2 | 50 | 90.2 | 2.34 | 4.88 | gelation |

TABLE 2

|  | Initial haze (%) | Increase in haze (%) | Time for complete dissolution (minute) |
|---|---|---|---|
| Ex. 1 | 0.53 | 28.7 | 27 |
| Ex. 2 | 0.60 | 33.2 | 26 |
| Ex. 3 | 0.44 | 31.6 | 35 |
| Ex. 4 | 0.51 | 34.1 | 36 |
| C. Ex. 1 | 0.57 | 51.5 | 3 |
| C. Ex. 2 | 0.60 | 17.8 | 65 |

As shown in the above Tables 1 and 2, it was confirmed that the films prepared in Examples 1 to 4 were colorless and transparent as well as excellent in solubility and mechanical properties, as compared with those prepared in Comparative Examples 1 and 2. In addition, since the films are excellent in flexibility, they can be advantageously used in the flexible display field.

The invention claimed is:

1. A polyamide-imide film, which comprises a polyamide-imide polymer formed by polymerizing an aromatic diamine compound, an aromatic dianhydride compound, and a dicarbonyl compound, wherein a dissolution time for which the polyamide-imide film in a square of 1 cm×1 cm and in a thickness of 30 μm to 100 μm is dissolved in 10 ml of dimethylacetamide (DMAc) is 5 to 60 minutes, wherein the polyamide-imide film has a yellow index of 5 or less, a haze of 2% or less, a transmittance of 85% or more, and a modulus of 5.0 GPa or more, based on a thickness of 50 μm, the aromatic dianhydride compound comprises 2,2'-bis(3,4-dicarboxyphenyl) hexafluoropropane dianhydride (6-FDA), wherein the aromatic diamine compound comprises 2,2'-bis(trifluoromethyl)-4,4'-diaminobiphenyl (TFDB), wherein the dicarbonyl compound comprises at least two different dicarbonyl compounds, wherein the dicarbonyl compound comprises terephthaloyl chloride (TPC), 1,1'-biphenyl-4,4'-dicarbonyl dichloride (BPDC), or a combination thereof, and
wherein a molar ratio of the imide repeat unit to the amide repeat unit is from 50:50 to 20:80.

2. The polyamide-imide film of claim 1, wherein the dissolution time is 10 minutes to 50 minutes.

3. The polyamide-imide film of claim 2, wherein the dissolution time is 20 minutes to 40 minutes.

4. The polyamide-imide film of claim 1, which has a yellow index of 3 or less, a haze of 1% or less, a transmittance of 88% or more, a modulus of 5.5 GPa or more, and a surface hardness of HB or higher, based on a thickness of 50 μm.

5. The polyamide-imide film of claim 1, wherein an amount of increase in haze of the polyamide-imide film is 20% to 50% measured according to a surface solubility measurement method which includes placing the surface of the polyamide-imide film on a flat surface, rubbing the surface of the polyamide-imide film back and forth 10 times with a cotton swab soaked in DMAc at a force of 0.1 N and at a speed of 5 cm/sec, and then measuring the amount of increase in haze.

6. A polyamide-imide film, which comprises a polyamide-imide polymer formed by polymerizing an aromatic diamine compound, an aromatic dianhydride compound, and a dicarbonyl compound, and which has a yellow index of 5 or less, a haze of 2% or less, a transmittance of 85% or more, and a modulus of 5.0 GPa or more, based on a thickness of 50 μm, wherein the aromatic diamine compound comprises 2,2'-bis(trifluoromethyl)-4,4'-diaminobiphenyl (TFDB), wherein the aromatic dianhydride compound comprises 2,2'-bis(3,4-dicarboxyphenyl) hexafluoropropane dianhydride (6-FDA), wherein the dicarbonyl compound comprises at least two different dicarbonyl compounds, wherein the dicarbonyl compound comprises terephthaloyl chloride (TPC), 1,1'-biphenyl-4,4'-dicarbonyl dichloride (BPDC), or a combination thereof, wherein a molar ratio of the imide repeat unit to the amide repeat unit is from 50:50 to 20:80, and wherein an amount of increase in haze of the polyamide-imide film is 20% to 50% measured according to a surface solubility measurement method which includes placing the surface of the polyamide-imide film on a flat surface, rubbing back and forth 10 times the surface with a cotton swab soaked in DMAc at a force of 0.1 N and at a speed of 5 cm/sec, and then measuring the amount of increase in haze.

7. The polyamide-imide film of claim 6, wherein the amount of increase in haze is 25% to 40%.

8. The polyamide-imide film of claim 6, which has a yellow index of 3 or less, a haze of 1% or less, a transmittance of 88% or more, a modulus of 5.5 GPa or more, and a surface hardness of HB or higher, based on a thickness of 50 μm.

9. The polyamide-imide film of claim 6, which is prepared by a process comprising: polymerizing the aromatic diamine compound, the aromatic dianhydride compound, and the least two dicarbonyl compounds to prepare a polyamide-imide polymer solution having a viscosity of 150,000 to 350,000 cps; extruding and casting the polymer solution; and then drying and thermally treating the cast polymer solution.

* * * * *